United States Patent [19]

Kangas

[11] Patent Number: 5,114,536

[45] Date of Patent: May 19, 1992

[54] METHOD FOR CLEANING FIBERS

[76] Inventor: Martti Y. O. Kangas, P.O. Box 2470, Decatur, Ga. 30031

[21] Appl. No.: 619,877

[22] Filed: Nov. 29, 1990

Related U.S. Application Data

[63] Continuation-in-part of Ser. No. 351,384, May 15, 1989, Pat. No. 4,976,822.

[51] Int. Cl.⁵ .......................... D21D 9/02; D21D 9/06
[52] U.S. Cl. ........................................ 162/55; 162/57; 162/60; 162/4; 8/156
[58] Field of Search ............... 162/55, 60, 380, 57, 162/4, 251, 243; 8/156; 68/181 R; 210/209, 215, 391, 396, 397

[56] References Cited

U.S. PATENT DOCUMENTS

| | | | |
|---|---|---|---|
| 4,215,447 | 8/1980 | Gartland et al. | 162/60 |
| 4,680,108 | 7/1987 | Ahs | 162/55 |
| 4,793,161 | 12/1988 | Richter et al. | 162/60 |

FOREIGN PATENT DOCUMENTS 1947092  9/1970  Fed. Rep. of Germany ........ 162/60

*Primary Examiner*—Steve Alvo
*Attorney, Agent, or Firm*—James B. Middleton

[57] ABSTRACT

The fibers of recycled paper are cleaned by agitating the slurry containing the fibers to maintain the fibers in suspension, and contacting the slurry with wash water to remove ink and other contaminants. The apparatus includes a passageway having screens forming opposite sides of the passageway. Agitators are within the passageway, and create enough turbulence to prevent fibers from settling or agglomerating. Channels adjacent to each screen carry wash water, and pump pressure creates a pressure differential across the screens to cause the wash water to contact the slurry and to be removed from the passageway.

5 Claims, 1 Drawing Sheet

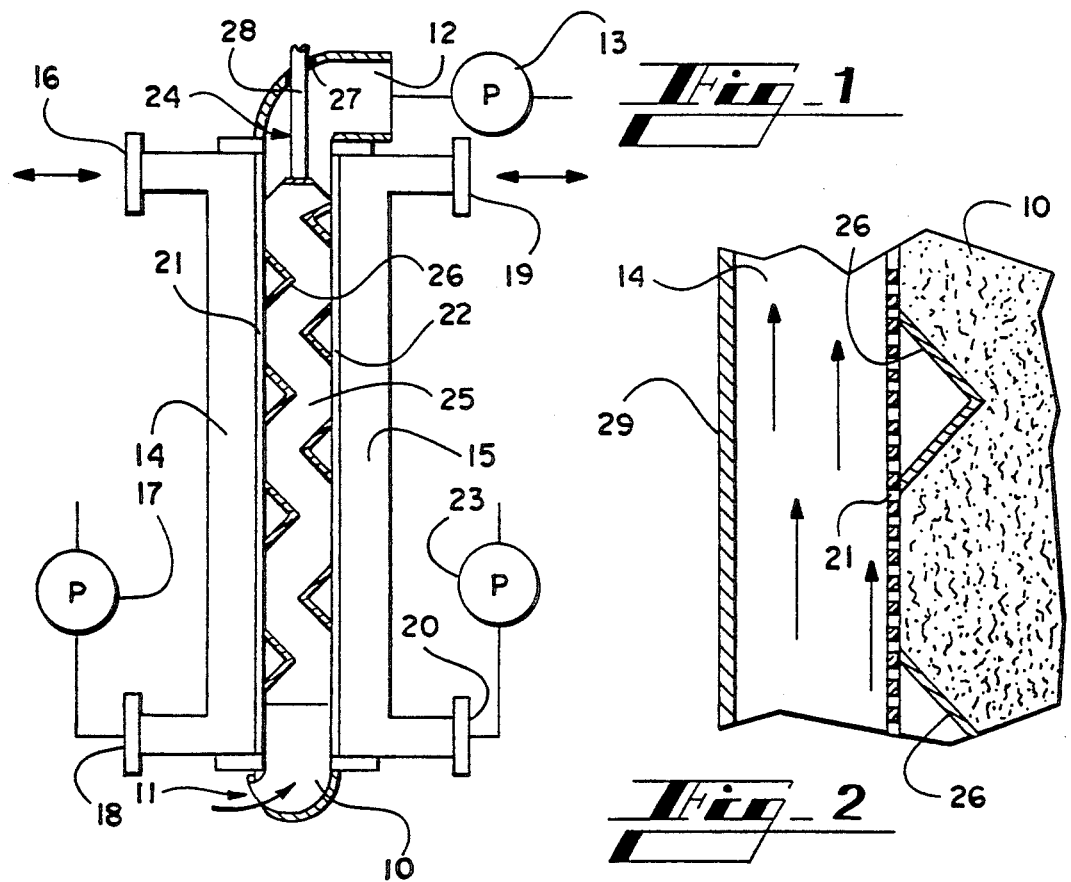
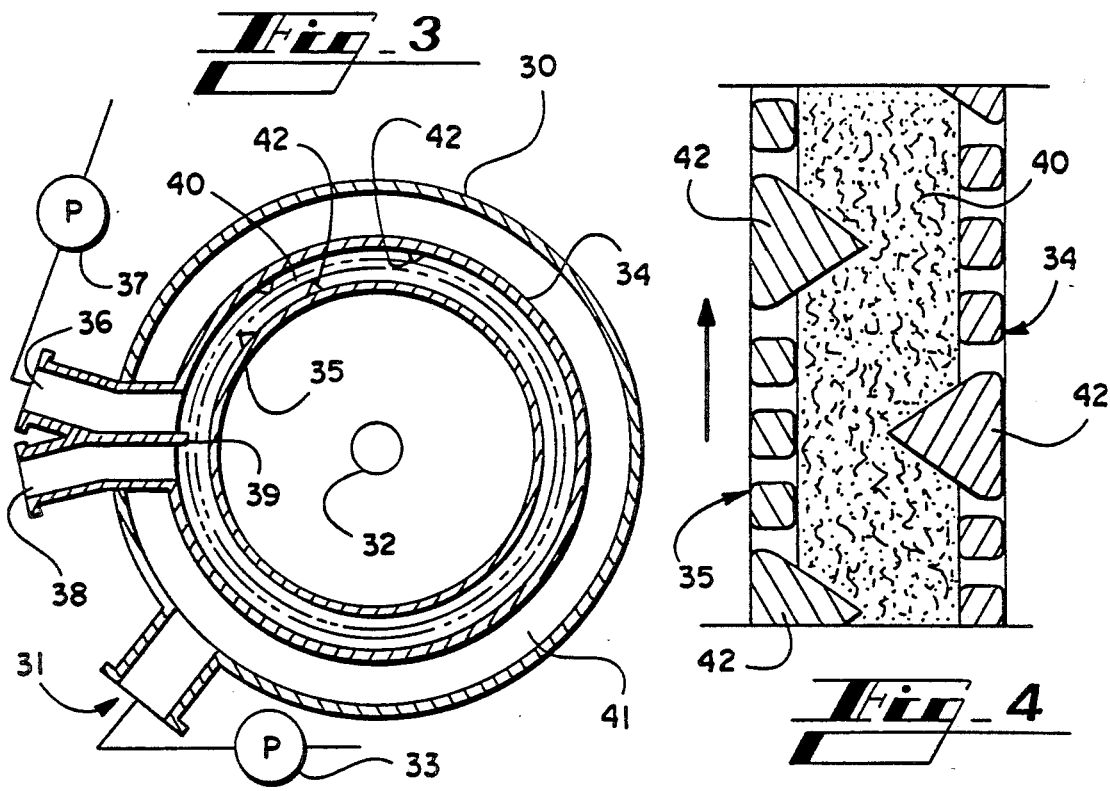

METHOD FOR CLEANING FIBERS

CROSS-REFERENCE TO RELATED APPLICATION

This application is a continuation-in-part of the copending application of the same inventor, titled "Method and Apparatus for Cleaning Fibers", filed May 15, 1989, under Ser. No. 351,384, issued on Dec. 11, 1990, as U.S. Pat. No. 4,976,822.

INFORMATION DISCLOSURE STATEMENT

It is well known in the art to recycle paper fibers by mechanically and chemically processing the paper into a slurry, and treating the slurry to remove ink, clay and other unwanted additives and contaminants. Conventional techniques including mechanical and chemical treatment, centrifuging, flotation, screening and the like will remove the greatest part of the unwanted material from the fibers, but the prior art techniques tend to leave a certain amount of ink and other contaminants on the fibers. As a result, the contaminants are present when the fibers are reused to make paper.

One technique utilized as a final step for removal of fine particles is to wash the fibers by allowing the fibers to collect on a screen, and flowing wash water over the fibers and through the screen. The concept is that the wash water will pick up the contaminants and carry the contaminants away from the fibers. The problem with the technique is that the fibers collect on the screen, and the mass of fibers tends to retain some of the contaminants so that the washing is not entirely effective. A similar technique is disclosed in the patent to Gartland U.S. Pat. No. 4,215,447. The Gartland device includes a screen on which the fibers tend to collect, and wash water is flowed through the fibers and through the screen. The Gartland improvement is in the provision of stirring means which removes clusters of fibers from the screen and causes the clusters to be entrained in a fluid stream moving from an inlet for the pulp to an outlet for the pulp. These clusters of fibers will of course retain ink and other contaminants to prevent complete cleaning of the fibers.

SUMMARY OF THE INVENTION

This invention relates generally to the cleaning of fibrous material, and is more particularly concerned with the removal of ink and other contaminants from fibers used in paper making and the like.

The present invention provides a method wherein a fluid suspension of fibers is cleaned by application of a washing fluid. More specifically, a slurry of fibers in fluid suspension is confined, at least one of the walls of the confinement being a screen. Fluidizing means assure that the fibers remain in a fluid state as a washing liquid is passed over the fibers to remove the undesirable contaminants. By proper selection of screens and adjustment of the pressure differential across the fluidized fiber, the undesirable contaminants can be removed without undue loss of fibers.

The apparatus of the present invention includes a first channel for passage of the fluidized fibers, the first channel having at least one wall made up of a screen. A second channel carries washing fluid, the second channel being arranged so that the washing fluid can pass through the screen to the first channel for cleaning the fiber and pass back to the second channel for discharge of the contaminants with the washing fluid.

In the preferred embodiment of the invention, the first channel includes screens on two opposed sides of the channel, and fluidizing means movable within the first channel. The first channel has second channel means contiguously disposed at the two screens, the arrangement being such that washing fluid can be directed along each screen and can be directed from one second channel means, through the first channel, and to another second channel means. The particular flow of the washing fluid is dependent on the pressure differentials used.

The present invention therefore provides a method and apparatus for cleaning fiber wherein the fiber remains in a fluidized state. In this fluidized state, a washing fluid is passed through the fibers to remove the unwanted contaminants from the fibers. The size of the screen, in conjunction with the pressure differential across the screen, will determine the maximum particle size that will be removed, and can be used for fractionating the fibers.

BRIEF DESCRIPTION OF THE DRAWINGS

These and other features and advantages of the present invention will become apparent from consideration of the following specification when taken in conjunction with the accompanying drawings in which:

FIG. 1 is an elevational view of a cleaning apparatus made in accordance with the present invention, the front of the passageway being removed to reveal the construction thereof;

FIG. 2 is an enlarged, fragmentary view showing the screen and fluidizing means in the device of FIG. 1;

FIG. 3 is a transverse cross-sectional view through a modified form of apparatus made in accordance with the present invention; and, FIG. 4 is an enlarged, fragmentary view showing the screen and fluidizing means in the device of FIG. 3.

DETAILED DESCRIPTION OF THE EMBODIMENTS

Referring now more particularly to the drawings, and to those embodiments of the invention here presented by way of illustration, FIG. 1 includes a central passageway 10 through which the slurry containing the fibers will pass. An inlet 11 allows entry of the slurry, and the cleaned material is discharged from the outlet 12. Those skilled in the art will understand that appropriate pumps or the like shown schematically at 13 will cause the slurry to move. Such apparatus is well known to those skilled in the art and no further showing is thought to be required.

On each side of the passageway 10 there are wash water channels 14 and 15. It will be noted that the channel 14 includes inlets/outlets 16 and 18, and channel 15 includes inlets/outlets 19 and 20. Each of the inlets/outlets 16–20 may be either an inlet or an outlet, or the wash water may be reversed periodically so the various inlets/outlets have different functions at different times. Pumps 17 and 23 are shown for moving the wash water through the channels 14 and 15. This will be discussed in more detail hereinafter.

The wall 21 between the channel 14 and the passageway 10 comprises a screen; and, the wall 22 between the passageway 10 and the channel 15 also comprises a screen. As a result, it will be understood that the wash water from the channels 14 and 15 can pass through the walls 21 and 22 and wash the fibers in the slurry flowing through the passageway 10.

An important feature of the present invention is the maintaining of the fibers in a fluidized state as the slurry flows through the passageway 10. More particularly, the individual fibers are not allowed to agglomerate or to collect on the screen 21 or 22. Anytime the fibers agglomerate, or collect together, it becomes difficult to bathe each fiber sufficiently in wash water and remove all contaminants from the fiber. Thus, the device in FIG. 1 includes fluidizing means generally designated at 24, the fluidizing means 24 including side plates 25 and a plurality of agitators 26. Agitators 26 are made of some impermeable material and are spaced throughout the length of the fluidizing means 24, the fluidizing means 24 in turn extending substantially the full distance of the passageway 10. Between the agitators 26, the fluidizing means 24 is open to the screens 21 and 22 so fluid can pass from within the fluidizing means 24 through the screens 21 and 22 and then to the channels 14 and 15.

At the upper end of the fluidizing means 24, it will be seen that there is a shaft 28, the shaft 28 comprising a means for causing vertical reciprocation of the fluidizing means 24. A conventional mechanism can be utilized to move the shaft 28 back and forth and cause the appropriate motion of the fluidizing means 24. A seal 27 prevents leakage around the shaft 28.

With the above description in mind, it should now be understood that a slurry including fibers to be cleaned will be admitted to the passageway 10 at the entrance 11. Appropriate pump pressure from the pump 13 will be applied to move the slurry from the entrance 11 to the discharge opening 12. As the slurry moves through the passageway 10, the fluidizing means 24 will be moved reciprocally and the plurality of agitators 26 will cause rather severe motion in the fluid to prevent fibers from agglomerating, and to prevent fibers from sticking to either of the screens 21 or 22. Meanwhile, wash water will be passed under pressure provided by pumps 17 and/or 23 through the channels 14 and 15. Arrangement of the apparatus is such that wash water can be directed as desired for the best cleaning. By way of example, wash water may be introduced at the inlet 16 at one end of the channel 14. The wash water may then be removed at the exit 20 of the channel 15. This arrangement will provide a counter flow of the two fluids, for the maximum cleaning ability. The process can be reversed, or two separate streams of wash water can be established, one in the channel 14 and one in the channel 15. It will be understood that the object of the invention is to cause the wash water to engage the slurry in the passageway 10 to pick up the various contaminants from the fibers, and to remove the contaminants in the slurry.

Looking now at FIG. 2 of the drawings, the construction is shown in more detail. The channel 14 is shown as having an outer wall 29, and the inner wall 21 which is a perforate screen. The agitators 26 are shown as angled devices extending into the passageway 10. Thus, as the fluidizing means 24 is moved reciprocally, the agitators 26 will move reciprocally. Agitators 26 are very close to the screen 21, so the agitators 26 will prevent accumulation on the screen somewhat by mechanically removing any fibers that are attached to the screen. More importantly, the motion of the agitators 26 will cause severe turbulence in the fluid within the passageway 10. This turbulence will be sufficient to maintain the fibers in a separated state, and also sufficient to prevent fibers from sticking to the screen 21.

It will be understood by those skilled in the art that used paper will generally be processed into a liquid, primarily by mechanical and chemical means, and some contaminants may be removed through prior processing. It is common to use sedimentation, centrifuging, and preliminary screening to remove some of the contaminants; and, flotation is commonly used for substantial cleaning of the fibers. Any of these conventional steps may be carried out initially, before the fiber is introduced to the apparatus shown in FIG. 1 of the drawings. As is stated above, the prior art techniques do not yield sufficiently clean fiber and something further is needed. The present invention can therefore be used as the final cleaning step, though of course some prior art steps may be omitted, and the apparatus and method of the present invention substituted therefor.

Attention is next directed to FIG. 3 of the drawings which shows a modified form of apparatus made in accordance with the present invention. The cleaning technique is the same as that discussed in connection with FIGS. 1 and 2, but the configuration of the apparatus is somewhat different.

In FIG. 3, there is a cylindrical container 30 having impermeable walls, and an inlet 31. At one end of the cylindrical container 30 there is an outlet designated at 32. Mounted within the container 30, and concentric therewith, there are two screens designated at 34 and 35. The screen 34 is stationarily mounted, and is provided with an inlet 36 and an outlet 38. While the inlet and outlet 36 and 38 are adjacent to each other, a wall 39 separates them for proper flow control.

Considering the description of the prior embodiment, it should be understood that a slurry or the like containing the fibers to be cleaned will be admitted through the inlet 36 so the fibers are contained in the passageway 40, between the two screens 34 and 35. A pump such as the pump 37 will cause the slurry to move around the passageway 40 and to be discharged at the discharge 38. However, while the slurry is moving around the passageway 40, wash water will be admitted through the inlet 31 to fill the channel 41. Appropriate pump pressure from the pump 33 will cause the wash water to move from the channel 41, through the screens 34 and 35 and to the center channel of the device to be discharged through the opening 32. As before, those skilled in the art will understand that the inlet and exit 36 and 38 are reversible, as are the inlet and exit 31 and 32. The flow can be periodically reversed or can be run in either direction as desired. Also, the inlet 31 may be located on an end of the apparatus, opposite the exit 32. The inlet and outlet 36 and 38 may also be located on the ends of the device, communicating with the passageway 40 between the screens 34 and 35.

If the inlet and outlet are located at the ends of the device, those skilled in the art will understand that the screen 34 can then be made to rotate, preferably counter to the rotation of the screen 35, for better agitation.

FIG. 4 is an enlarged section of the screens 34 and 35 and it will be seen that each of the screens includes a plurality of agitators 42. The agitators 42 are here shown as being angled members similar to the agitators 26, the agitators 42 being integrally formed with the screens 34 and 35; but, it will be understood that additional pieces can be attached to an existing screen if desired.

It will therefore be understood that the operation of the apparatus shown in FIGS. 3 and 4 is substantially the same as the operation of the device shown in FIGS. 1 and 2. The screen 35 will be substantially constantly rotated while the apparatus is in use. Rotation of the screen 35 will cause relative motion between the agitators 42 so the slurry in the passageway 40 will be in a highly turbulent flow. As is mentioned above, the turbulence will be sufficient to prevent fibers from collecting on either screen, and will be sufficient to prevent the agglomeration of fibers in the fluid stream. As a result, the wash water passing through the channel 41 and through the screens 34 and 35 will clean the fibers and carry the unwanted contaminants from the passageway 40, through the screen 34 or 35 and into the discharge 32.

It will also be understood by those skilled in the art that contaminants to be removed from the fiber must be small enough to pass through the openings in the screen 21, 22, 34, or 35. There is always a compromise in selecting a screen small enough to prevent the loss of fibers but large enough to allow loss of the unwanted contaminants. Utilizing the method and apparatus of the present invention it should further be recognized that the pressure of the wash water is another variable that will allow removal of more or less of the contaminants and more or less of the fibers.

Through the use of extremely high pressure, which is to say a large pressure differential across a screen, some small fibers might be forced through the screen. With a smaller pressure differential, relatively solid particles such as ink or clay might pass through the screen whereas a fiber will not pass through the screen. The present invention therefore provides additional controls, and excellent cleaning of the fibers with minimal loss of the fibers.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. In the method for cleaning fiber, wherein paper is processed to separate the fibers therein and to suspend said fibers in a liquid to form a slurry, and wash water contacts said fibers to remove contaminants from said fibers, the improvement comprising the steps of passing said slurry through a passageway, constantly agitating said slurry for fluidizing said slurry and preventing agglomeration of said fibers and assuring that said fibers remain as separate, individual, fibers in suspension in said slurry, and contacting said slurry with wash water for removing contaminants from said fibers during the said step of constantly agitating said slurry for fluidizing said slurry, the said step of contacting said slurry with wash water including forming opposed walls of said passageway of the screen, providing at least one channel carrying wash water adjacent to said screen, and creating a pressure differential between said at least one channel and said passageway, the arrangement being such that wash water moves through the screen walls of said passageway and contacts said individual fibers, and said wash water and said contaminants move through said screen walls and into said at least one channel.

2. In the method of claim 1, the further improvement wherein said at least one channel comprises a plurality of channels disposed on opposite sides of said passageway, and wherein said steps of creating a pressure differential includes creating a pressure differential between said channels on opposite sides of said passageway.

3. In the method of claim 2, the improvement wherein said pressure differential is periodically reversed.

4. In the method of claim 2, the further improvement comprising the step of varying said pressure differential for selecting the particle size to be removed from said slurry by moving through said screen walls and into said channel.

5. In the method of claim 2, the further improvement comprising the step of varying the size of said screen for selecting the particle size to be removed from said slurry by moving through said screen walls and into said channel.

* * * * *